United States Patent
Vinayak et al.

(10) Patent No.: US 6,918,181 B2
(45) Date of Patent: Jul. 19, 2005

(54) GEAR TOOTH TOPOLOGICAL MODIFICATION FOR REDUCING NOISE AND VIBRATION IN TRANSMISSION SYSTEMS

(75) Inventors: Harsh Vinayak, Meriden, CT (US); Bruce D. Hansen, Shelton, CT (US); Edward J. Karedes, Cheshire, CT (US); Clark V. Cooper, Glastonbury, CT (US); Lawrence M. Zunski, Seymour, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/421,621

(22) Filed: Apr. 22, 2003

(65) Prior Publication Data

US 2004/0088861 A1 May 13, 2004

Related U.S. Application Data

(60) Provisional application No. 60/425,216, filed on Nov. 12, 2002.

(51) Int. Cl.[7] .............................................. B23P 15/14
(52) U.S. Cl. ...................... 29/893.35; 29/893; 29/893.3; 74/462; 451/47
(58) Field of Search ............................. 29/893, 893.3, 29/893.35; 74/460, 462, 606 R; 451/32, 34, 47

(56) References Cited

U.S. PATENT DOCUMENTS

| | | | | |
|---|---|---|---|---|
| 2,318,179 A | * | 5/1943 | Mentley | 409/33 |
| 3,982,444 A | * | 9/1976 | Rouverol | 74/462 |
| 4,276,785 A | * | 7/1981 | Rouverol | 74/462 |
| 4,589,300 A | * | 5/1986 | Rouverol | 74/462 |
| 4,651,588 A | * | 3/1987 | Rouverol | 74/462 |
| 4,761,867 A | * | 8/1988 | Vollmer et al. | 29/893.3 |
| 5,083,474 A | * | 1/1992 | Rouverol | 74/461 |
| 5,271,288 A | * | 12/1993 | Hayduk et al. | 74/462 |
| 5,315,790 A | * | 5/1994 | Kish et al. | 451/5 |
| 5,341,699 A | * | 8/1994 | Rouverol | 74/462 |
| 5,456,139 A | * | 10/1995 | Aubin | 74/640 |
| 5,485,761 A | * | 1/1996 | Rouverol | 74/462 |
| 5,503,481 A | * | 4/1996 | Hashimoto et al. | 384/569 |
| 5,537,889 A | * | 7/1996 | Shigeura et al. | 74/464 |
| 5,873,770 A | * | 2/1999 | Hashimoto | 451/32 |
| 6,080,199 A | * | 6/2000 | Umeyama et al. | 703/1 |
| 6,112,611 A | * | 9/2000 | Maki | 74/462 |
| 6,134,786 A | * | 10/2000 | Graupner et al. | 29/893.35 |
| 6,205,879 B1 | * | 3/2001 | Litvin et al. | 74/457 |
| 6,282,502 B1 | * | 8/2001 | Sundaresan et al. | 703/1 |
| 6,732,606 B1 | * | 5/2004 | Zhu et al. | 74/460 |

FOREIGN PATENT DOCUMENTS

WO    WO 9604495 A1 * 2/1996 .......... F16H/55/08

* cited by examiner

*Primary Examiner*—Essama Omgba
(74) *Attorney, Agent, or Firm*—Carlson, Gaskey & Olds

(57) ABSTRACT

A method for improving acoustic and vibrational properties of gears includes determining the transmission errors of intermeshing gears due to stiffness variations in the gear teeth, performing Gear Tooth Topological (GTT) modifications to compensate for the errors, and isotropically processing the gears to produce an ultra-smooth surface finish. Additional errors from isotropic processing, machining, loading, thermal effects and/or load sharing may be summed with the errors from the stiffness variations and used for the GTT modifications. The teachings of the present invention may reduce noise by as much as 13 to 15 dB.

12 Claims, 7 Drawing Sheets

| SPUR GEAR MESH | |
|---|---|
| GTT | -8 db |
| ISOTROPIS FINISH (ISF) | -7 db |
| GTT + ISF | -15 db |

*FIG. 12*

GEAR TOOTH TOPOLOGICAL MODIFICATION FOR REDUCING NOISE AND VIBRATION IN TRANSMISSION SYSTEMS

REFERENCE TO RELATED APPLICATIONS

This Application claims benefit from the Provisional Application Ser. No. 60/425,216 filed Nov. 12, 2002.

TECHNICAL FIELD

This invention is directed to a method for reducing noise in gear trains/transmissions and more particularly, to a new and useful method for reducing noise in transmission systems induced by intermeshing gear teeth.

BACKGROUND OF THE INVENTION

Noise and vibration control is a primary concern for the transmission design engineer, and particularly so in the design of a helicopter main transmission. Excessive vibrations generated by transmissions typically result in undesirable noise levels in helicopter cockpits and/or cabins, which causes operator/passenger aural discomfort and/or damage to sensitive on-board instrumentation. Cabin and/or cockpit noise/vibration abatement is a particular concern in helicopters wherein the final stage of reduction gearing of the main transmission comprises one or more bull pinions interacting with a central bull gear.

For example, Sikorsky helicopters of the S-76 series, e.g., S-76A, S-76B, S-76C, have a main transmission that includes three stages of reduction gearing: a first stage for each engine output consisting of helical gearing, an intermediate stage consisting of spiral bevel gearing, and a final reduction stage comprising a central bull gear that intermeshes with right and left hand bull pinions (to combine the inputs of the two engines that provide the motive power for the helicopter). Research has shown that the cockpit and/or cabin noise levels of S-76 helicopters are primarily the result of vibrations originating in the main transmission.

Narrow band Fast Fourier Transform (FFT) analyses, A-weighted octave levels, and overall DBA levels recorded in the cockpits and/or cabins of S-76A, S-76B, and S-76C helicopters indicate that interior noise levels are predominately the result of vibrations occurring at the bull gearing meshing frequency of 778 Hz, as illustrated in FIG. 1. The vibrations produced by the first and second reduction stages of S-76 main transmission gearboxes, i.e., the noise levels generated by the helical and spiral gearing as illustrated in FIG. 1, occur at higher frequencies and typically are not significant relative to the dominant noise levels produced by the fundamental and first few harmonics of the bull gearing meshing vibrations.

The gearbox vibrations resulting from bull gear meshing are transmitted to the helicopter airframe via the transmission housing. The resultant airframe vibrations generate noise in the helicopter cockpit and/or cabin. Abatement of such noise by acoustic treatment of the cockpit and/or cabin interior is generally inefficient, and therefore, effective noise control solutions must be implemented at the noise source, i.e., the main transmission.

To effectively abate such noise, it is necessary to identify the primary causal factor(s) of bull gearing vibrations. The vibrations generated by the aforedescribed helicopter main transmission may be aggravated by meshing between misaligned bull gearing, i.e., the central bull gear and bull pinion(s). Previous efforts to reduce the noise levels generated by intermeshing between misaligned bull pinions and the central bull gear included modifications to provide effective bull gear tip relief. This technique is also referred to as "crowning" of the gear teeth. While such modifications resulted in a modest reduction in bull gearing vibrations, the resultant reduced interior noise levels of S-76 helicopters were adjudged to still present an unacceptable level of aural discomfort.

Yet other methods for reducing noise are described in Hayduk et al. U.S. Pat. No. 5,271,288 wherein tooth topological modifications are employed. Therein the generation of noise is attributed to thermal expansion of and within the transmission gearbox and the differential thermal expansion caused by dissimilar metals/materials (i.e., materials having different coefficients of thermal expansion). As such, testing indicated that the distance between centerlines of the adjacent intermeshing gears grew larger as a result of elevated temperatures. Consequently, material was added to the chordal addenda of the gear teeth (i.e., essentially the top lands) to compensate for the thermally-induced transmission errors. While the patent discloses tooth topological modifications to reduce noise levels, it does not address the root causes of noise generated by intermeshing gears. Consequently, the teachings therein are limited to helicopter gearboxes, and more particularly, to a specific drive train configuration used in a specific helicopter model.

A need exists to more fully identify the design and operating parameters that cause noise induced by the intermeshing gears of a drive train. An effective solution for noise abatement can only be implemented based upon the identification and understanding of the causal parameter(s) of such vibration generation.

SUMMARY OF THE INVENTION

It is an object of the present invention to provide a method for reducing noise induced by the intermeshing of gear teeth in a torque transmitting drive train.

It is another object of the present invention to provide a method which addresses the causal factors involved in the generation of transmission noise.

It is yet a further object of the present invention to provide a method which results in a passive means for noise reduction, i.e., one that does not require the addition of other mechanisms or systems, thereby reducing cost, enhancing reliability and ameliorating the complexity of the drive train.

These and other objects are achieved by a method for producing intermeshing gears having improved acoustic characteristics characterized by: examining the transmission errors due to mesh stiffness variations, performing Gear Tooth Topological (GTT) modification to compensate for such errors, and isotropic processing of the face surfaces of the gear teeth to produce an ultra-smooth surface finish.

In other embodiments, the method includes the additional steps of determining the transmission errors due to isotropic processing, summing these transmission errors with those associated with mesh stiffness variations and performing GTT modifications to compensate for the combined errors.

Other GTT modifications to compensate for transmission errors caused by machining, loading, thermal effects and/or load sharing may be combined to optimize the gear for both noise and structural efficiency

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 12 shows a table with noise reduction in dB for GTT and Isotropic finishing processes.

BEST MODE FOR CARRYING OUT THE INVENTION

The invention described herein is best illustrated by reference to a particularly relevant application which best demonstrates its utility and advantages. The chosen application relates to a helicopter gearbox having highly-loaded torque transmitting gears, however, it will be appreciated that the inventive teachings are applicable to any drive train having intermeshing gear teeth. Furthermore, the invention will be described in the context of manufacturing a spur gear, yet the method is equally applicable to the fabrication of bevel, face, helical gears/pinions etc. Hence, the specific embodiments described are not intended to be limiting but merely illustrative of the inventive method.

Figure 1:
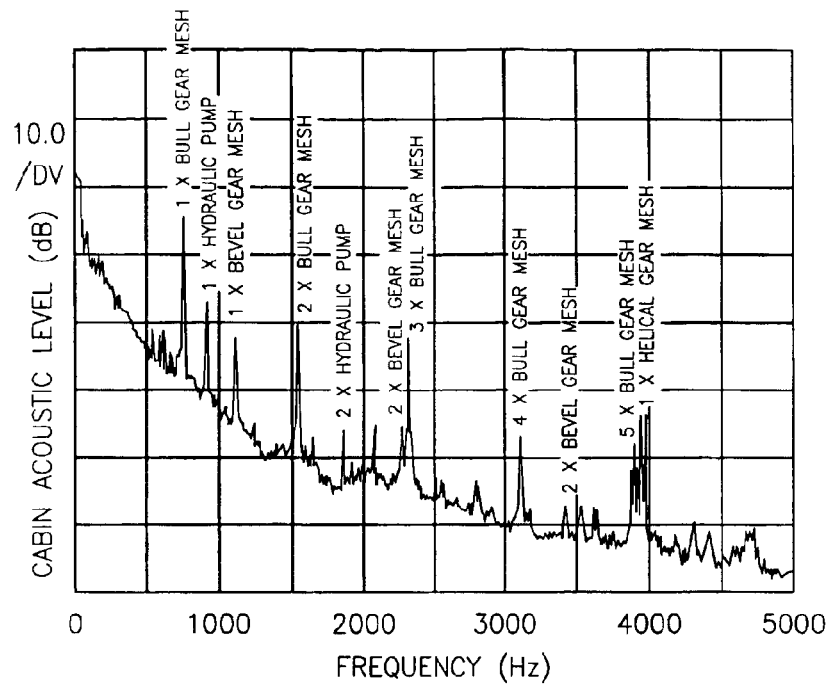
FIG. 1 is a graphical representation of the acoustic signature generated by a conventional helicopter transmission wherein the noise induced by intermeshing gears is concentrated at the bull gearing meshing frequency of the transmission.
Figure 2:
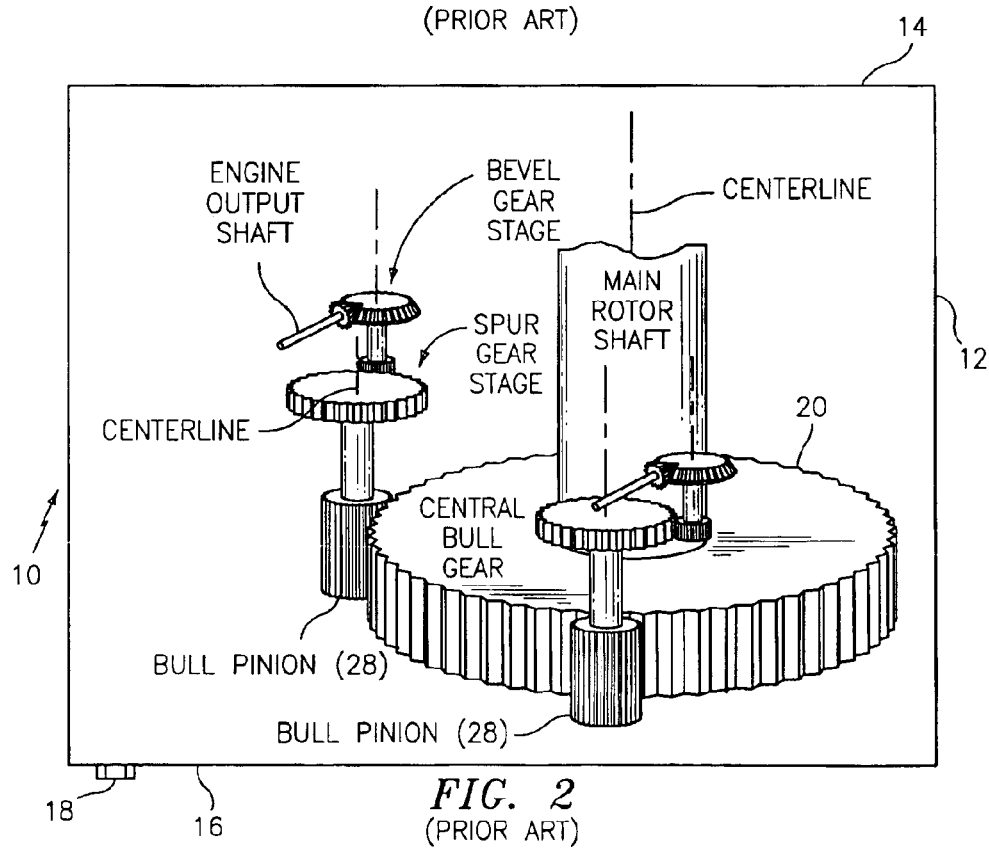
FIG. 2 is an illustration of an exemplary helicopter transmission system wherein the method of manufacturing gears to reduce noise was tested and validated.

In FIG. 2, a helicopter transmission employed in a Sikorsky S-76 series helicopter is shown. The transmission 10 comprises a housing 12 formed by an upper conical casing 14 secured in combination with a lower base casing 16 by means of through-bolts 18. A central bull gear 20 is mounted for rotation within the gearbox housing 12 by means of support bearings 22 (not shown) disposed in combination with upper and lower stub axles (not shown), respectively. Ends of the upper and lower stub axles are connected to the upper conical casing 14 and the lower base casing 16, respectively.

Two bull pinions 28 are mounted for rotation within the gearbox housing 12 by means of pinion bearings (not shown). For the purposes of expediency, only two gears will be discussed hereinafter, namely, the central bull gear 20 and the bull pinions 28, which have been demonstrated to be a principal cause of noise generation. That is, the intermeshing gear teeth of these gears produce 778 Hz vibrations and, as discussed in the Background of the Invention, are a primary source of aural discomfort.

This invention will specifically identify the gear tooth topological modifications necessary to reduce noise, and, as the inventors uncovered, the modifications necessary to dramatically improve the acoustic signature generated by gear teeth interaction, sometimes referred to as "gear clash". Such reductions are on the order of 13 to 15 dB a which, as any acoustic engineer or scientist will appreciate, represents significant acoustic reductions.

Before discussing the specific Gear Tooth Topological (GTT) modifications, it will be important to understand the causal factors underlying the origin of noise induced by intermeshing gears. This is particularly important inasmuch as the making of this invention is, perhaps, as much a result of recognizing a problem (i.e., understanding the source of the noise), as it has to do with the teachings necessary to compensate for/solve the problem.

It can be stated that noise emanating from the intermeshing of gears is a function of transmission error and, more accurately, a function of the variable or vibratory component of transmission error. That is, if gears and gear teeth were infinitely rigid and ideally fabricated/assembled, the result would be ideal or smooth torque transmission along the "line of action", and no noise would be generated. Stated yet another way, since there would be no periodic motions, loads or deflections, no cyclic variations would occur and, consequently, noise would not be produced.

The principal cause of noise induced by intermeshing gear teeth is a function of mesh stiffness variations as one or more gear teeth engage or disengage as the gear rotates. That is, it should be understood that at one moment in time only a single tooth may be engaging another tooth of an intermeshing gear while at yet another moment two gear teeth may come into engagement. The same discussion applies to higher contact ratio gears where, for instance, three gear teeth may be in contact with a mating gear at one moment, and four gear teeth may be in contact at another moment. Notwithstanding the specific contact ratio of the gearing, the stiffness of the load path varies periodically. The stiffness is high when, for example, two teeth are engaged and lower, in comparison, when only one tooth engages. One can also examine the corollary, which is the magnitude of tooth loading. When one tooth is engaged, tooth loading is high, while when two teeth engage, the load is shared and tooth loading is comparatively lower.

Furthermore, in addition to variable tooth engagement, variations occur even during contact of a single tooth. Viewing one tooth as a cantilever beam having a base rigidly affixed at the root radius, as an individual tooth rides and slides along the side surface of a mating intermeshing tooth, the moment arm to the base varies, and, consequently, the stiffness and/or load imposed on the tooth. These variations in mesh stiffness, which may also be viewed as variations in transmission error, are a primary causal factor of noise in a drive train/transmission.

Figure 3:
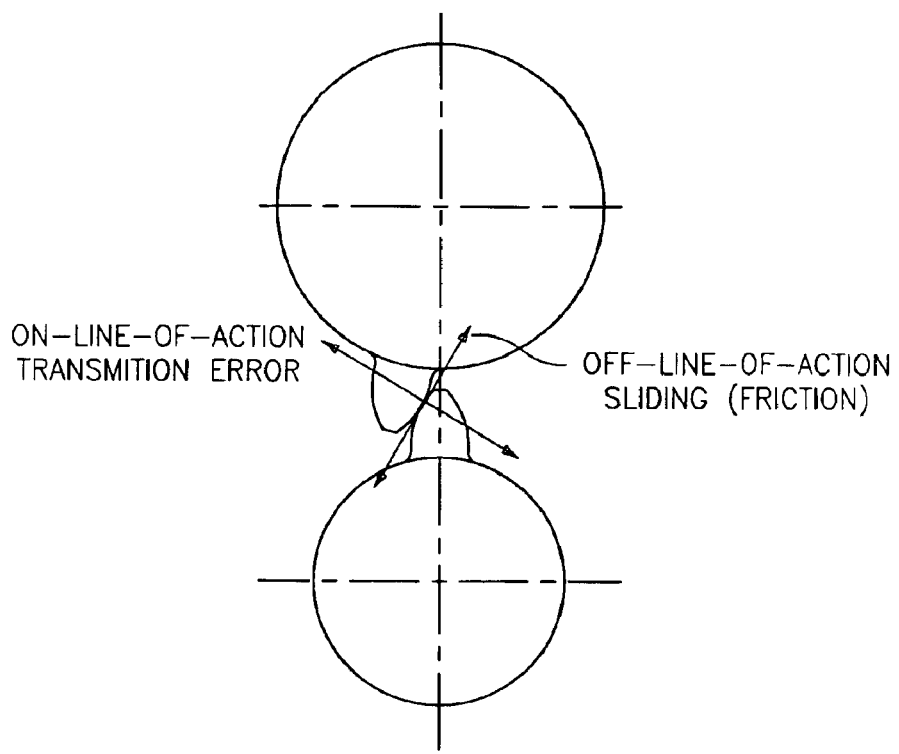
FIG. 3 is a schematic of gear mesh forces showing on-line-of-action and off-line-of-action forces.

While this "on-line-of action" vibratory component of transmission error is a principle factor, yet another factor relates to the sliding or shearing action of the intermeshing gear teeth. This sliding or shearing may be viewed as occurring orthogonally to the "line of action" or "off-line" as shown in FIG. 3, and has been identified as yet another significant contributor to the total acoustic signature. In the past, this off-line vibratory component was generally ignored due to the dominance or magnitude of the vibratory component along the line of action. As the latter, however, is skillfully suppressed by GTT modifications such as the type described herein, the former becomes more noticeable and requires addressing.

Inasmuch as the various factors/noise components described above occur as an inherent geometric characteristic of gears having teeth, such noise components can never be entirely eliminated. However, by understanding why and how such noise is generated is crucial to its suppression and/or reduction.

Prior to implementing the various inventive steps for manufacturing a gear having improved acoustic characteristics, it will be necessary to use standard gear design methodology for developing a desired or baseline gear for a particular application and to implement various well-known pre-processing steps. With respect to developing a baseline gear, all of the standard gear characteristics including, inter alia, the pitch diameter, root diameter, involute, tooth thickness, lead and root radii and face width etc., are designed using conventional engineering analysis and techniques. This baseline gear will be used to develop a master gear having a master geometry used for the fabrication of all subsequent production gears. A gear is then fabricated in accordance with the anticipated tooth involute for minimizing transmission error. The baseline gear then undergoes various bench tests, either simulating its operating environment or placed in its actual intended environment, to gather transmission error data. Upon collection of such data, Gear Tooth Topological modification data in accordance with the present invention is developed.

Before discussing the specific teachings relating to GTT modifications associated with the method of the present invention, it should also be noted that the master gear and/or any production gear may include one or more pre-processing steps. For example, it is common practice to rough grind and harden the teeth of a gear, especially those used in high torque applications such as a helicopter rotor transmission. Alternatively, a gear may be formed by casting, thereby eliminating the rough grinding operation, or may not be carbonized, thereby eliminating the hardening operation. Suffice it to say that a pre-processed gear having gear teeth which are either dimensionally oversized or, alternatively, do not contain any GGT medications, is provided.

Figure 4:
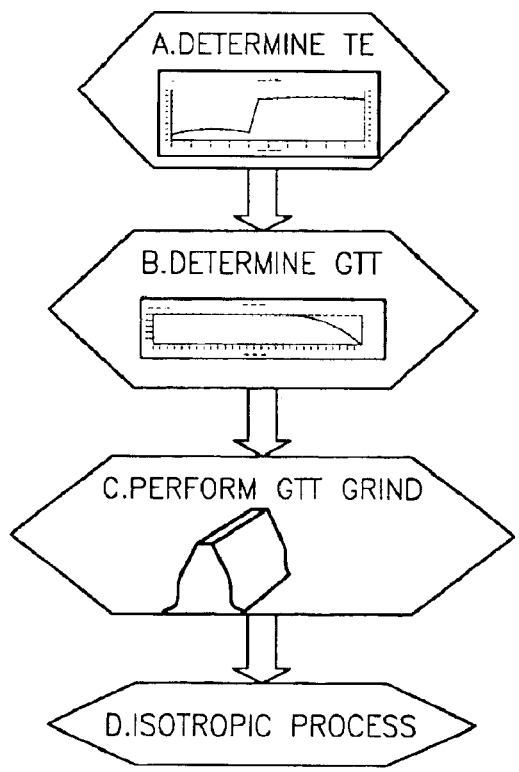
FIG. 4 is a flow-diagram of the method according to the present invention.

In FIG. 4, the essential process steps for reducing noise include steps A through D of the flow diagram. In step A, the variable component of transmission error due to mesh stiffness variations of the intermeshing gear teeth of the baseline gear is determined. In step B, the Gear Tooth Topological (GTT) modifications are determined to compensate for the variable transmission error of the baseline gear. In step C, the baseline gear is finish ground in accordance with the GTT modifications to develop a modified gear tooth profile. Finally, the gear is subject to isotropic processing of the gear teeth to produce ultra-smooth gear tooth face surfaces. Isotropic processing will be discussed in greater detail hereinbelow.

Figure 5:
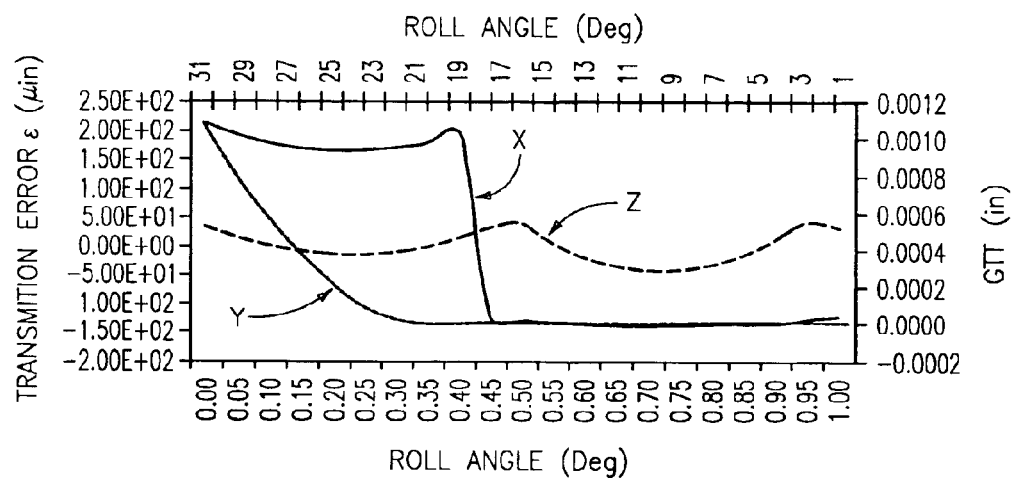
FIG. 5 is a graphical representation of the anticipated or measured variable transmission error due to mesh stiffness variations and the Gear Tooth Topological (GTT) modifications necessary to compensate for such variable transmission error.

In this, the broadest embodiment of the invention, step A is performed by analytically or empirically determining (i.e., bench testing) the vibratory or variable component of transmission error due solely to mesh stiffness variations. As earlier described, as the number of teeth in engagement cyclically varies, the stiffness and/or load varies to produce noise. In FIG. 5, curve X is a plot of the transmission error $\epsilon$ as a function of the rotational position of the gear teeth. Curve Y depicts the GTT modifications necessary to compensate for the tooth error caused by stiffness variation. Here, the objective is not necessarily to eliminate or reduce the transmission error, but to effect a constant or steady transmission error $\epsilon$ as shown by the transmission error curve Z. Those skilled in the art will readily be capable of interpreting and translating the transmission error corrections, curve Y, into GTT modifications for the purposes of finish grinding the gear teeth.

Figure 6A:
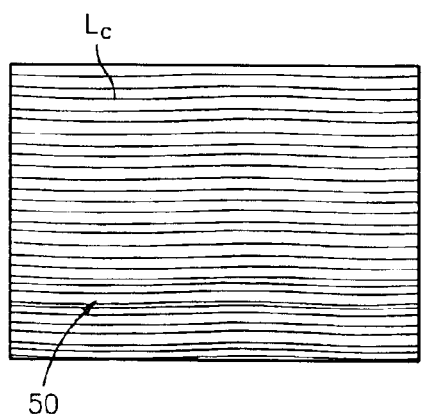
FIG. 6a is a magnified view of the face surface of a gear tooth fabricated by a conventional grinding wheel.
Figure 6B:
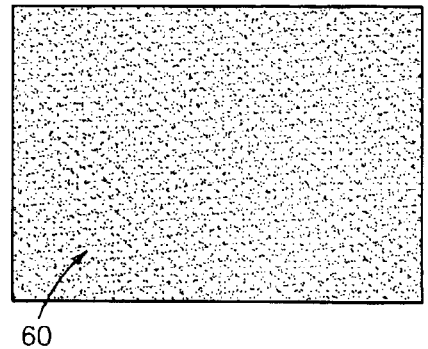
FIG. 6b is a magnified view of the face surface of a gear tooth fabricated by isotropic processing.

Step D of FIG. 4 involves a final isotropic processing step. This process is a surface finishing operation wherein the surface exhibits no discernable directional machining marks. To better understand this isotropic characteristic, a comparison is drawn between a conventional tooth surface formed by finish grinding and a surface formed by isotropic processing. In FIG. 6a, a magnified tooth surface 50 (magnification≈50×) reveals the cut lines left behind by the grinding wheel. One will notice the very clear and definite direction of the cut lines $L_c$ as well as the topographical imperfections caused by the grinding operation. In FIG. 6b, a magnified tooth surface 60 (magnification≈50×) formed by an isotropic process reveals a noticeable absence of such cut lines or imperfections. This process produces an ultra-smooth surface finish by comparison to the grinding operation.

As will be recalled in the earlier discussion, sliding or shearing of intermeshing teeth also contributes to the total noise signature. As such, it will be appreciated that by isotropic processing the friction coefficient on the face surfaces of the gear teeth is dramatically reduced. So too, is the component of noise produced by the sliding action of the intermeshing gear teeth. Consequently, the combination of GTT modifications to reduce the vibratory component of transmission error and isotropic processing effects dramatic noise reduction.

To yet further reduce noise, the inventors decided to examine the tooth profile alterations, if any, caused by isotropic processing and whether such alterations adversely impacted the GTT modifications made in Step B above. To better understand why or how isotropic processing may impact the surface geometry or dimensions, one must examine the steps employed in isotropic processing.

Figure 7:
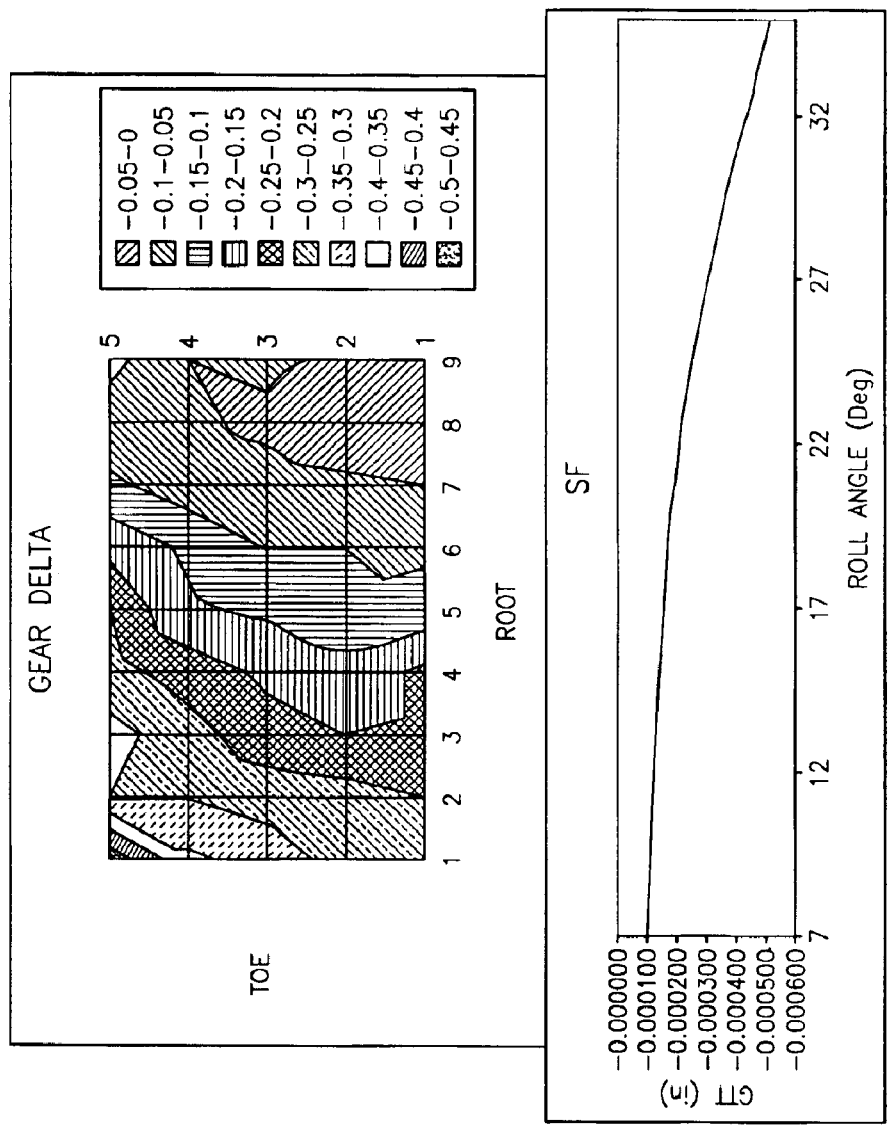
FIG. 7 is a map of the dimensional differences of a gear tooth before and after isotropic processing.
Figure 8:
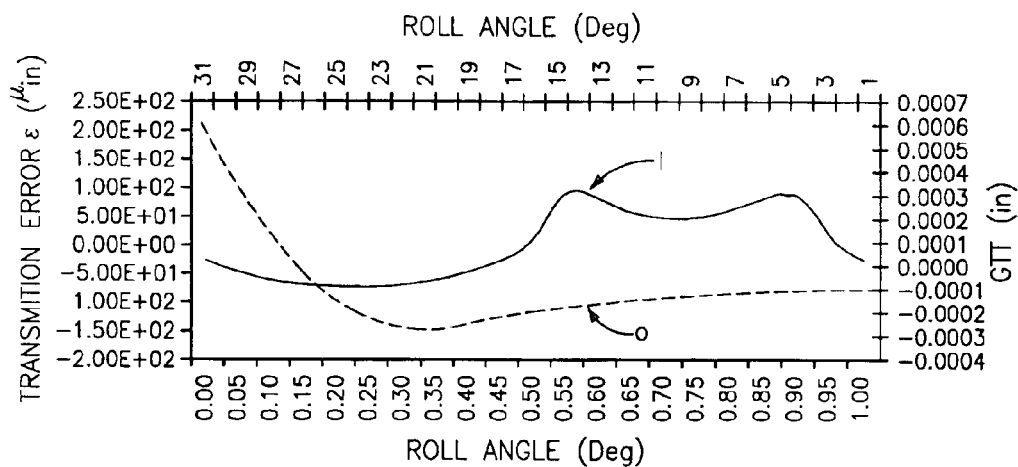
FIG. 8 is a map of transmission errors effected by isotropic processing and the GTT modifications necessary to compensate for such transmission errors.

Isotropic processing generally involves the steps of treating the gear tooth surfaces to remove smear metal, i.e., a fragmented, non-crystalline surface. One such process involves large and small ceramic elements that are placed in a high frequency shaking apparatus and the subject gear for isotropic processing is submersed in the ceramic element slurry. By shaking the container, the exposed surfaces of the gear, e.g., gear teeth, bearing surfaces etc, are impacted in a random manner. The result is an ultra-smooth isotropic surface i.e., with non-directional surface properties. Having empirically measured the dimensions prior to and following the isotropic process, the inventors mapped the results (as seen in FIG. 7). Examination of the map revealed significant dimensional differences and transmission error was analyzed in view of these dimensional differences. Further study led the inventors to conclude that the transmission errors were sufficiently large to potentially impact the GTT modifications made for reducing noise induced by variations in mesh stiffness. A map of transmission errors effected by superfinishing is shown in FIG. 8. Curve I defines the transmission errors induced by isotropic processing and curve O defines the net changes necessary in the GTT to compensate for such transmission error. This transmission error is essentially a sum of transmission errors associated with mesh stiffness variations (Curve Y) and those due to material removal by the said isotropic process. Once again those skilled in the art will readily be capable of translating the resultant transmission error into a combined or resultant GTT modification for compensation purposes.

Figure 9:
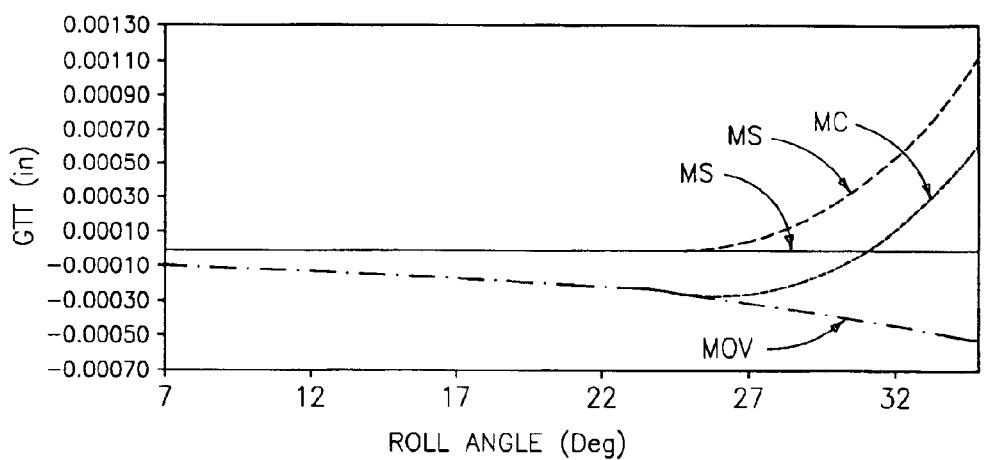
FIG. 9 is an enlarged view of a baseline gear tooth and the GTT modifications necessary, according to the present invention, for compensating for transmission errors effected by mesh stiffness variations and isotropic processing.

While the precise tooth profile geometry is either analytically or empirically derived based upon the teachings described above, it may be generally stated that, when cutting the gear teeth, more material is caused to remain along the entire involute due to the effects of isotropic processing. FIG. 9 shows a typical tooth involute, or baseline tooth involute BI, wherein the first dashed lines of curve MS defines the GTT modifications to compensate for variations in transmission error caused by mesh stiffness variations. The dotted line of curve MOV defines the GTT modifications to compensate for isotropic-process induced transmission errors, and the dashed-dotted line of curve MC defines the resultant GTT modifications to compensate for both, mesh stiffness variation and isotropic processing. It is along this line that the gear tooth should be manufactured/cut to optimize noise reduction.

Figure 10:
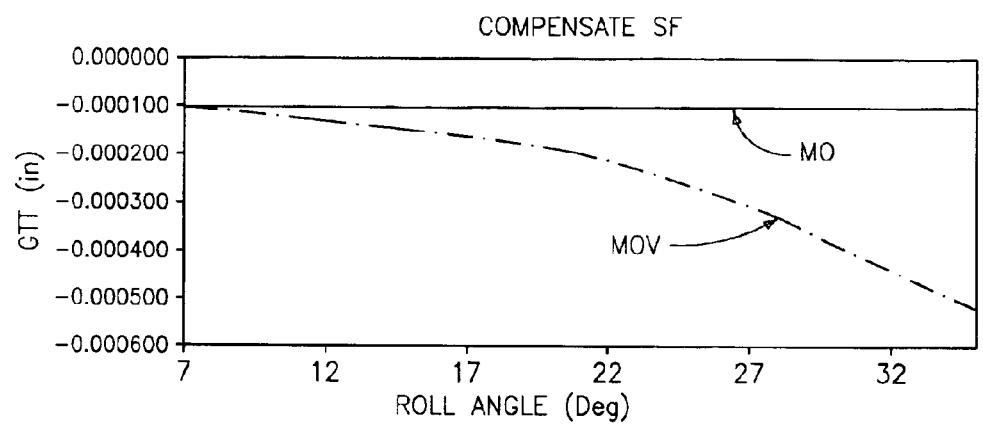
FIG. 10 is an enlarged view of a baseline gear tooth and the GTT modifications necessary for compensating for isotropic processing.

In yet another embodiment, the isotropic process effects yet other dimensional differences which may be addressed by additional GTT modifications. Inasmuch as the isotropic process employs both large and small spherical ceramic elements, surface areas protected by the geometry of the gear tooth or teeth, e.g., the root of a spur gear teeth or heel of bevel gears, see less abrasion. That protected regions, such as dedendum, those proximal to adjacent teeth or structure will only be impacted by the smaller ceramic elements, and consequently, impacted less frequently. On the other hand, exposed areas such as the addendum of a spur gear or toe of a bevel gear see more abrasion. That is, exposed areas, or those distal from adjacent teeth or structure, will see abrasion from both large and small ceramic elements and, consequently, impacted more frequently. Consequently, to compensate for this effect of the isotropic process, more material should be caused to remain on exposed areas, e.g., the tip region of the face surface, than protected areas, e.g., the root region of the face surface. This embodiment is schematically shown in FIG. 10 wherein the solid line MO defines the GTT modifications to compensate for the isotropic processing, but without variation as discussed above. A dotted line MOV defines the GTT modifications with variation from tip to root.

Figure 11:
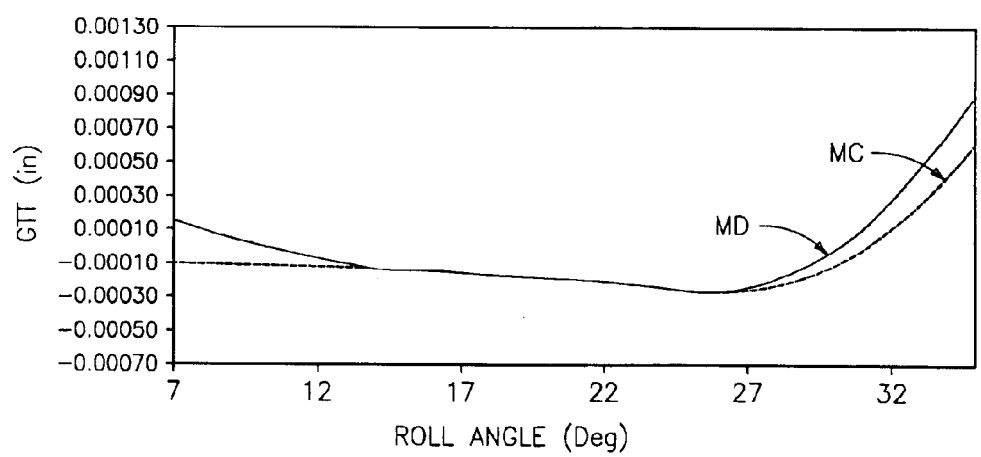
FIG. 11 shows yet additional process steps for making GTT modifications based upon transmission errors caused by machining, loading conditions, and thermal environment of the gear/gear teeth.

In FIG. 11, yet other GTT modifications may be employed in combination with the GTT modifications described above. GTT modifications due to load-induced transmission errors may be combined with one or the other of the GTT modifications associated with mesh stiffness variations or isotropic processing. Furthermore, GTT modifications made as a result of thermal expansion and differences in thermal strain may be combined with any or all of the about GTT modifications, shown as curve MD.

FIG. 12 shows a Table with Noise Reduction obtained by applying only GTT and isotropic finishing and a combination of the two. As seen from the table, the noise reductions due to the two processes are additive and the combination of the two processes results in a superior noise characteristics.

In summary the method according to the present invention produces intermeshing gears having substantially improved acoustic characteristics. The method combines GTT modifications necessary to compensate for mesh stiffness induced transmission errors with isotropic processing. Further, the method combines GTT modifications necessary to compensate for mesh stiffness variations and GTT modifications necessary to compensate for isotropic processing. Further the invention combines these with yet other GTT modifications to optimize acoustic and structural characteristics of the gear teeth. Moreover, the method of the present invention provides a passive means for noise reduction Although the invention has been shown and described with respect to exemplary embodiments thereof, it should be understood by those skilled in the art that various changes, omissions and additions may be made without departing from the spirit and scope of the present invention.

What is claimed is:

1. A method for producing intermeshing gears having improved acoustic characteristics, said gears having a plurality of intermeshing gear teeth each defining a gear tooth profile and a face surface, said method for application on a pre-processed baseline gear and characterized by:

determining a variable component of transmission error due to mesh stiffness variations of said intermeshing gear teeth of said baseline gear;

determining a process-induced transmission error due to dimensional changes effected by an isotropic surface finishing process of said gear teeth of said baseline gear;

determining a first Gear Tooth Topological (GTT) modification for said gear teeth to compensate for said variable component of transmission error of said baseline gear;

determining a second Gear Tooth Topological (GTT) modifications for said gear teeth to compensate for said process-induced variable transmission error of said baseline gear;

summing said first and second Gear Tooth Topological (GTT) modifications for determining a resultant GTT modification;

finish grinding said gear teeth in accordance with said resultant GTT modification, and isotropic processing of said gear teeth to produce smooth gear tooth face surfaces.

2. The method according to claim 1 wherein each said gear teeth includes exposed gear tooth face surfaces forming an exposed region distal from an adjacent gear tooth and protected gear face surfaces forming a protected region proximal to an adjacent gear tooth and wherein said second GTT modifications are greater in said exposed region than in said protected region.

3. The method according to claim 2 wherein said baseline gear is a spur gear, and said exposed region is a tip portion of said gear tooth face surfaces and said protected region is a root portion of said gear tooth face surfaces.

4. The method according to claim 2 wherein said baseline gear is a bevel gear, and said exposed region is disposed along a toe portion of said gear and said protected region is a heel portion of said gear.

5. The method according to claim 1 further characterized by the steps of:

determining a load-induced transmission error due to loads imposed on said gear; and determining a third Gear Tooth Topological (GTT) modifications for said gear teeth to compensate for said load-induced transmission error;

summing said third GTT modifications for determining said resultant GTT modification; and wherein said finish grinding step employs said resultant GTT modification.

6. The method according to claim 5 wherein each said gear teeth includes exposed gear tooth face surfaces forming an exposed region distal from an adjacent gear tooth and protected gear face surfaces forming a protected region proximal to an adjacent gear tooth and wherein said second GTT modifications due to said isotropic processing are greater in said exposed region than in said protected region.

7. The method according to claim 1 further characterized by the steps of:
  determining a temperature-induced transmission error due to thermal strain on said gear;
  determining a third Gear Tooth Topological (GTT) modifications for said gear teeth to compensate for said temperature-induced transmission error;
  summing said third GTT modifications for determining said resultant GTT modification; and
  wherein said finish grinding step employs said resultant GTT modification.

8. The method according to claim 7 wherein each said gear teeth includes exposed gear tooth face surfaces forming an exposed region distal from an adjacent gear tooth and protected gear face surfaces forming a protected region proximal to an adjacent gear tooth and wherein said second GTT modifications due to said isotropic processing are greater in said exposed region than in said protected region.

9. The method according to claim 1 further characterized by the steps of:
  determining a fabrication-induced transmission error due to machining variations during manufacture of said gear;
  determining a third Gear Tooth Topological (GTT) modifications for said gear teeth to compensate for said fabrication-induced transmission error;
  summing said third GTT modifications for determining said resultant GTT modification; and
  wherein said finish grinding step employs said resultant GTT modification.

10. The method according to claim 9 wherein each said gear teeth includes exposed gear tooth face surfaces forming an exposed region distal from an adjacent gear tooth and protected gear face surfaces forming a protected region proximal to an adjacent gear tooth and wherein said second GTT modifications due to said isotropic processing are greater in said exposed region than in said protected region.

11. The method according to claim 1 further characterized by the steps of:
  determining a fabrication-induced transmission error due to machining variations during manufacture of said gear;
  determining a third Gear Tooth Topological (GTT) modifications for said gear teeth to compensate for said fabrication-induced transmission error;
  determining a load-induced transmission error due to loads imposed on said gear; and
  determining a fourth Gear Tooth Topological (GTT) modifications for said gear teeth to compensate for said load-induced transmission error;
  determining a temperature-induced transmission error due to thermal strain on said gear;
  determining a fifth Gear Tooth Topological (GTT) modifications for said gear teeth to compensate for said temperature-induced transmission error;
  summing said third, fourth, and fifth GTT modifications for determining said resultant GTT modification; and
  wherein said finish grinding step employs said resultant GTT modification.

12. The method according to claim 11 wherein each said gear teeth includes exposed gear tooth face surfaces forming an exposed region distal from an adjacent gear tooth and protected gear face surfaces forming a protected region proximal to an adjacent gear tooth and wherein said second GTT modifications due to said isotropic processing are greater in said exposed region than in said protected region.

* * * * *